(12) United States Patent
Tomoda et al.

(10) Patent No.: US 10,916,266 B2
(45) Date of Patent: Feb. 9, 2021

(54) MAGNETIC DISK DEVICE CAPABLE OF SETTING RECORDING CONDITION USING SERVO PATTERN

(71) Applicants: Kabushiki Kaisha Toshiba, Tokyo (JP); Toshiba Electronic Devices & Storage Corporation, Tokyo (JP)

(72) Inventors: Yusuke Tomoda, Kanagawa (JP); Takeyori Hara, Kanagawa (JP); Nobuhiro Maeto, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/509,549

(22) Filed: Jul. 12, 2019

(65) Prior Publication Data

US 2020/0265867 A1 Aug. 20, 2020

(30) Foreign Application Priority Data

Feb. 20, 2019 (JP) .................................. 2019-028328

(51) Int. Cl.
*G11B 5/00* (2006.01)
*G11B 5/596* (2006.01)
*G11B 20/12* (2006.01)

(52) U.S. Cl.
CPC ...... *G11B 5/59688* (2013.01); *G11B 5/59638* (2013.01); *G11B 20/1217* (2013.01); *G11B 2005/001* (2013.01); *G11B 2005/0021* (2013.01); *G11B 2005/0024* (2013.01); *G11B 2020/1238* (2013.01); *G11B 2220/2516* (2013.01)

(58) Field of Classification Search
None
See application file for complete search history.

(56) References Cited

U.S. PATENT DOCUMENTS

| 8,000,046 | B2 | 8/2011 | Yamazaki | |
| 9,007,723 | B1* | 4/2015 | Igarashi | G11B 5/314 360/125.3 |
| 9,030,772 | B2 | 5/2015 | Kim | |
| 9,047,921 | B2 | 6/2015 | Jen et al. | |
| 2006/0109583 | A1* | 5/2006 | Sado | G11B 5/59633 360/75 |
| 2006/0117333 | A1* | 6/2006 | Taguchi | G11B 5/012 720/659 |
| 2006/0187565 | A1* | 8/2006 | Takase | G11B 19/02 360/69 |
| 2009/0185305 | A1 | 7/2009 | Cho et al. | |
| 2011/0181977 | A1 | 7/2011 | Kim et al. | |

(Continued)

FOREIGN PATENT DOCUMENTS

JP 2014-2812 A 1/2014

*Primary Examiner* — Tan X Dinh
(74) *Attorney, Agent, or Firm* — White & Case LLP (57) ABSTRACT

According to one embodiment, a magnetic disk device includes a magnetic head, a magnetic disk on which a servo pattern used to position the magnetic head when data is to be recorded by means of the magnetic head is recorded, and a control section configured to set a recording condition for each predetermined unit of the magnetic disk on the basis of the servo pattern, and carry out recording of data on the magnetic disk according to the set recording condition.

6 Claims, 10 Drawing Sheets

(56) References Cited

U.S. PATENT DOCUMENTS

| | | | |
|---|---|---|---|
| 2013/0083423 A1* | 4/2013 | Shiroishi | G11B 5/3146 360/75 |
| 2013/0229895 A1* | 9/2013 | Shiroishi | G11B 5/1278 369/13.14 |
| 2013/0279039 A1* | 10/2013 | Shiroishi | G11B 20/1217 360/48 |
| 2013/0335847 A1* | 12/2013 | Shiroishi | G11B 5/02 360/46 |
| 2016/0049169 A1 | 2/2016 | Haapala et al. | |

* cited by examiner

MAGNETIC DISK DEVICE CAPABLE OF SETTING RECORDING CONDITION USING SERVO PATTERN

CROSS REFERENCE TO RELATED APPLICATIONS

This application is based upon and claims the benefit of priority from Japanese Patent Application No. 2019-028328, filed Feb. 20, 2019, the entire contents of which are incorporated herein by reference.

FIELD

Embodiments described herein relate general to a magnetic disk device and recording method of the magnetic disk device.

BACKGROUND

A magnetic disk device includes a recording medium configured to record data thereon by magnetism. The recording medium has, for example, a discoid shape and is configured in such a manner that data is recorded on a surface layer of the discoid in a circumferential direction thereof by means of a magnetic head. In a recording medium of this kind, variations in the magnetic characteristics occur in a recording area in one circumference due to the creation principle. In general, in one circumference, a magnetic disk device is configured to record data items under the same recording condition, and hence the recording condition is determined on the basis of the characteristics of the recording area most difficult to record of all the recording areas in the circumference. By setting the recording condition in this way, the data recording quality in one circumference is guaranteed in the magnetic disk device.

Incidentally, when the recording condition is determined on the basis of the characteristics of the recording area most difficult to record of all the recording areas in one circumference, a case where although the recording condition is satisfied, the optimum is not obtained is conceivable in the areas other than the recording area concerned. That is, in this case, the recording condition becomes excessive. For this reason, in the areas other than the recording area concerned, data is recorded with excessive recording quality.

It should be noted that a technique in which in order to prevent a case where the aforementioned recording condition becomes excessive from occurring in a magnetic disk device, a test pattern is written, the writing quality of the test pattern is evaluated, whereby the distribution in the circumference is evaluated in advance, and the current waveform is changed for each sector on the basis of the result is known.

Further, a technique in which in a magnetic disk device, the recording density is changed according to the distribution in the circumference of the medium examined in advance is known.

In the aforementioned technique of writing the test pattern, an area configured to store therein the test pattern, and processing for evaluation become necessary. Further, in the aforementioned technique of changing the recording density, when the recording density is made excessively high, a case where a problem in the reliability of data occurs is conceivable.

Accordingly, a magnetic disk device capable of setting an appropriate recording condition by a method different from the aforementioned technique of optimizing the recording condition is required.

An object of the present invention is to provide a magnetic disk device and recording method of the magnetic disk device capable of improving the quality of magnetic recording by appropriately setting a recording condition.

DETAILED DESCRIPTION

In general, according to one embodiment, a magnetic disk device includes a magnetic head, a magnetic disk on which a servo pattern used to position the magnetic head when data is to be recorded by means of the magnetic head is recorded, and a control section configured to set a recording condition for each servo sector of the magnetic disk on the basis of the servo pattern, and carry out recording of data on the magnetic disk according to the set recording condition.

Hereinafter, embodiments will be described with reference to the accompanying drawings. It should be noted halt the disclosure has been presented by way of example only, and the contents described in the following embodiments are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted bar identical reference numbers, and detailed descriptions are omitted in some cases.

First Embodiment

Figure 1:
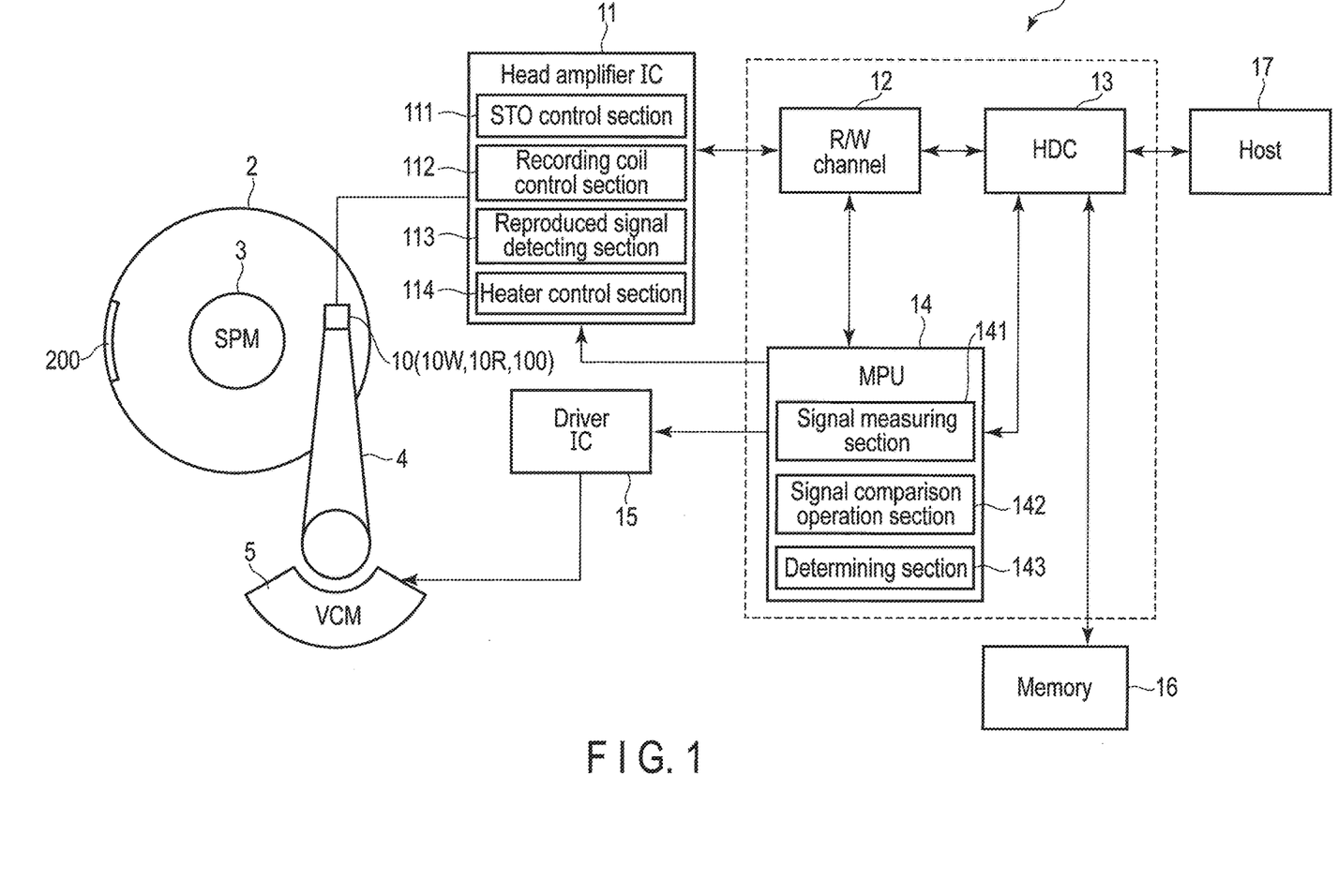
FIG. 1 is a view showing an example of the configuration of a magnetic disk device according to a first embodiment.

FIG. 1 is a block diagram of a magnetic disk device according to a first embodiment.

As shown in FIG. 1, a magnetic disk device 1 is configured as, for example, a hard disk drive (HDD) and is provided with a magnetic disk (hereinafter referred to as a disk) 2, spindle motor (SPM) 3, actuator 4, voice coil motor (VCM) 5, magnetic head (hereinafter referred to as a head) 10, head amplifier IC 11, R/W channel 12, hard disk controller (HDC) 13, microprocessor (MPG) 14, driver IC 15, and memory 16. Further, the magnetic disk device 1 is connectable to a host computer (host) 17. The head 10 is provided with a write head (writer) 10W, read head (reader) 10R, and Spin-Torque-Oscillator (STO) 100 which is a high-frequency oscillation device. It should be noted that the R/W channel 12, HDC 13, and MPU 14 may be incorporated in a one-chip integrated circuit.

The disk 2 includes a substrate constituted of a non-magnetic material formed into, for example, a disk-like shape. In each of the surfaces of the substrate, a soft magnetic layer constituted of a material exhibiting soft magnetic characteristics and serving as a foundation layer, magnetic recording layer having magnetic anisotropy in a direction perpendicular to the disk surface and located on the soft magnetic layer, and protective film layer located on the magnetic recording layer are stacked one on top of the other in the order mentioned. Here, the direction to the head 10 is defined as the upper layer direction.

The disk 2 is fixed to the spindle motor (SPM) 3 and is rotated at a predetermined rotational speed by the SPM 3. It should be noted that the not only one disk 2 but also a plurality of disks 2 may be provided on the SPM 3. The SPM 3 is driven by a drive current (or drive voltage) to be supplied thereto from the driver IC 15. On/from the disk 2, data patterns are recorded/reproduced by the head 10. The disk 2 has a monitor area (evaluation area) 200. The monitor area 200 is an area exclusively used for evaluating the oscillation characteristics of the STO 100. The monitor area 200 is provided, for example, at an outermost or innermost part in the radial direction of the disk 2.

The actuator 4 is rotatably provided and head 10 is supported on the apical part thereof. The actuator 4 is rotated by the voice coil motor (VCM) 5, whereby the head 10 is moved and positioned to a location on the desired track of the disk 2. The VCM 5 is driven by a drive current (or drive voltage) to be supplied thereto from the driver IC 15.

The head 10 includes a slider 8, write head 10W and read head 10R formed on the slider 8. A plurality of heads 10 are provided according to the number of the disks 2.

The head amplifier IC 11 includes a circuit relating to drive, detection of the oscillation characteristics, and the like of the STO 100. The head amplifier IC 11 includes, for example, an STO control section 111, recording coil control section 112, reproduced signal detecting section 113, and heater control section 114. The head amplifier IC 11 executes drive of the STO 100, drive signal detection, and the like. Furthermore, the head amplifier IC 11 supplies a write signal (write current) corresponding to write data to be supplied thereto from the R/W channel 12 to the write head 10W. Further, the head amplifier IC 11 amplifies a read signal output from the read head 10R and transmits the amplified read signal to the R/W channel 12.

The STO control section 111 controls a current to be supplied to the STO 100 of the write head 10W.

The recording coil control section 112 includes a recording signal pattern control section and recording current control section. The recording coil control section 112 controls a recording current to be supplied to a coil of the write head 10W according to the write signal.

The reproduced signal detecting section 113 detects a signal (read data) reproduced by the read head 10R.

The heater control section 114 controls supply of electric power to a heater. That is, the heater control section 114 switches between on/off of the heater.

The R/W channel 12 is a signal processing circuit configured to process a signal relating to read/write. The R/W channel 12 includes a read channel configured to execute signal processing of read data and write channel configured to execute signal processing of write data. The R/W channel 12 converts a read signal into digital data and demodulates read data from the digital data. The R/W channel 12 encodes write data to be transferred thereto from the HDC 13 and transfers the encoded write data to the head amplifier IC 11.

The HDC 13 controls write of data to the disk 2 and read of data from the disk 2 through the head 10, head amplifier IC 11, R/W channel 12, and MPU 14. The HDC 13 constitutes an interface between the magnetic disk device 1 and host 17 and executes transfer control of read data and write data. That is, the HDC 13 functions as a host interface controller configured to receive a signal transferred thereto from the host 17 and transfer the signal to the host 17. When transferring a signal to the host 17, the HDC 13 executes error-correction processing of data of a reproduced signal read and demodulated by the head 10 in accordance with the MPU 14. Further, the HDC 13 receives a command (write command, read command or the like) transferred thereto from the host 17 and transmits the received command to the MPU 14.

The MPU 14 is a main controller (control section) of the magnetic disk device 1 and executes control of a read/write operation and servo control necessary for positioning of the head 10. The MPU 14 includes a signal measuring section 141, signal comparison operation section 142, and determining section 143. The functions of the signal measuring section 141, signal comparison operation section 142, and determining section 143 are executed by firmware (program).

The signal measuring section 141 makes the head 10 execute a recording/reproducing operation of a sign and reads data recorded on the disk 2 to thereby acquire a reproduced signal. The signal measuring section 141 stores data relating to the acquired reproduced signal in the memory 16. Further, the signal measuring section 141 transmits the data relating to the acquired reproduced signal to the signal comparison operation section 142. For example, the signal measuring section 141 makes the head 10 execute recording of a data pattern of a state where supply of electric power to the STO 100 is on, data pattern of a state where the supply of electric power to the STO 100 is off, and data pattern of a state where a value of the current to be supplied to the STO 100 is less than the normal operation time, and makes the head 10 (head amplifier IC 11) acquire the reproduced signal in each of the aforementioned states.

The signal comparison operation section 142 acquires data relating to the reproduced signal obtained by reading the data pattern recorded in each of the states where the supply of electric power to the STO 100 is on, where the supply of electric power to the STC 100 is off, and where the value of the current to be supplied to the SIC 100 is less than the normal operation time from the memory 16, and subjects each of the data items to operational processing such as comparison and the like. The signal comparison operation section 142 stores a result of the operational processing in the memory 16. Further, the signal comparison operation section 142 transmits the result of the operational processing to the determining section 143.

The determining section 143 determines the oscillation characteristics of the STO 100 from the result of the operational processing of the signal comparison operation section 142. That is, the determining section 143 determines the deterioration of the STO 100 or good/bad (pass/fail) quality of the STO 100 from the result of the operational processing of the signal comparison operation section 142. The determining section 143 has a determination value serving as a criterion for evaluating the oscillation characteristics of the STO 100. This determination value can arbitrarily be set. The determination value is, for example, a threshold or the like of a value (comparison data) used for comparison with data relating to the acquired reproduced signal. The determining section 143 determines the oscillation characteristics of the STO 100 according to whether the comparison data is greater or less than the determination value. The determining section 143 may include a function of instructing the magnetic disk device 1 to issue a warning when the comparison data reaches the predetermined determination value. Here, the comparison data is, for example, difference data or ratio data of data relating to the reproduced signal.

The driver IC 15 controls drive of the SPM 3 and VCM 5 in accordance with the control of the MPU 14. By driving the VCM 5, the head 10 is positioned to a target track on the disk 2.

The memory 16 includes a volatile memory and nonvolatile memory. The memory 16 includes, for example, a buffer memory constituted of a DRAM, and flash memory. The memory 16 stores therein programs and parameters necessary for processing of the MTU 14.

Figure 2:
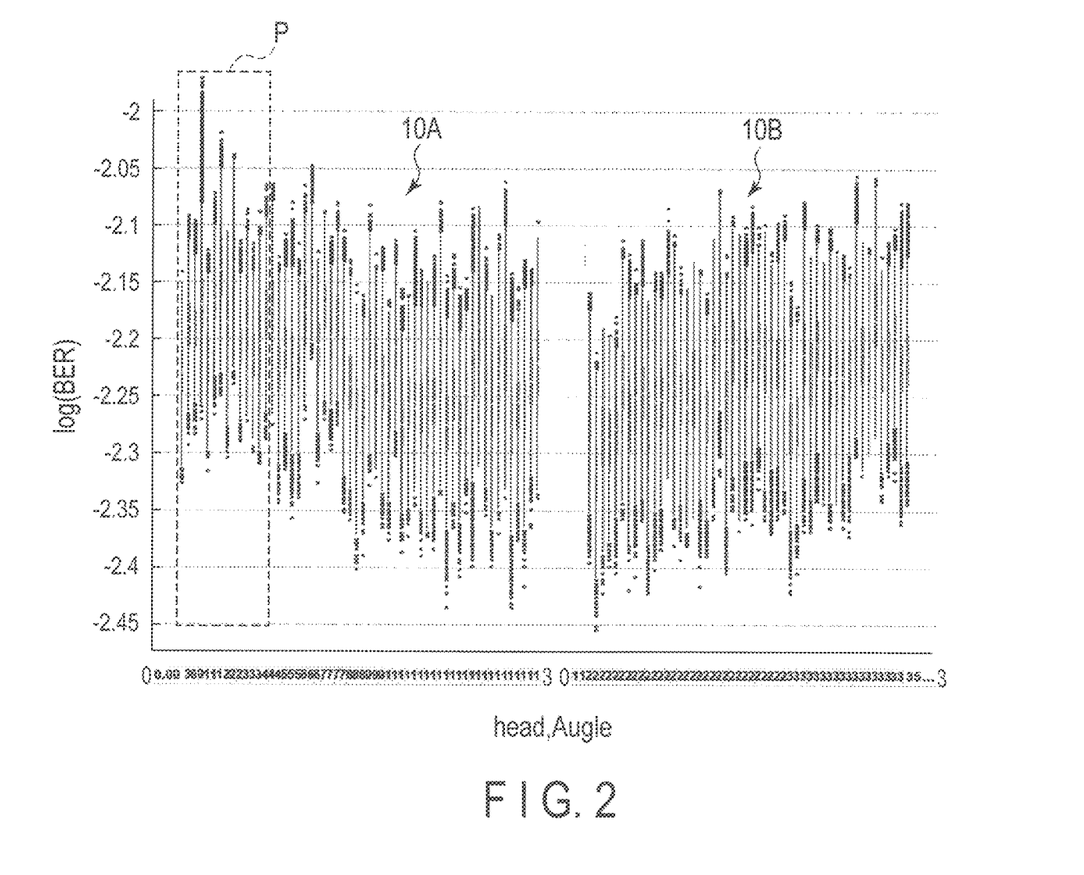
FIG. 2 is a view showing an example of the hitherto known BER distribution.
Figure 3:
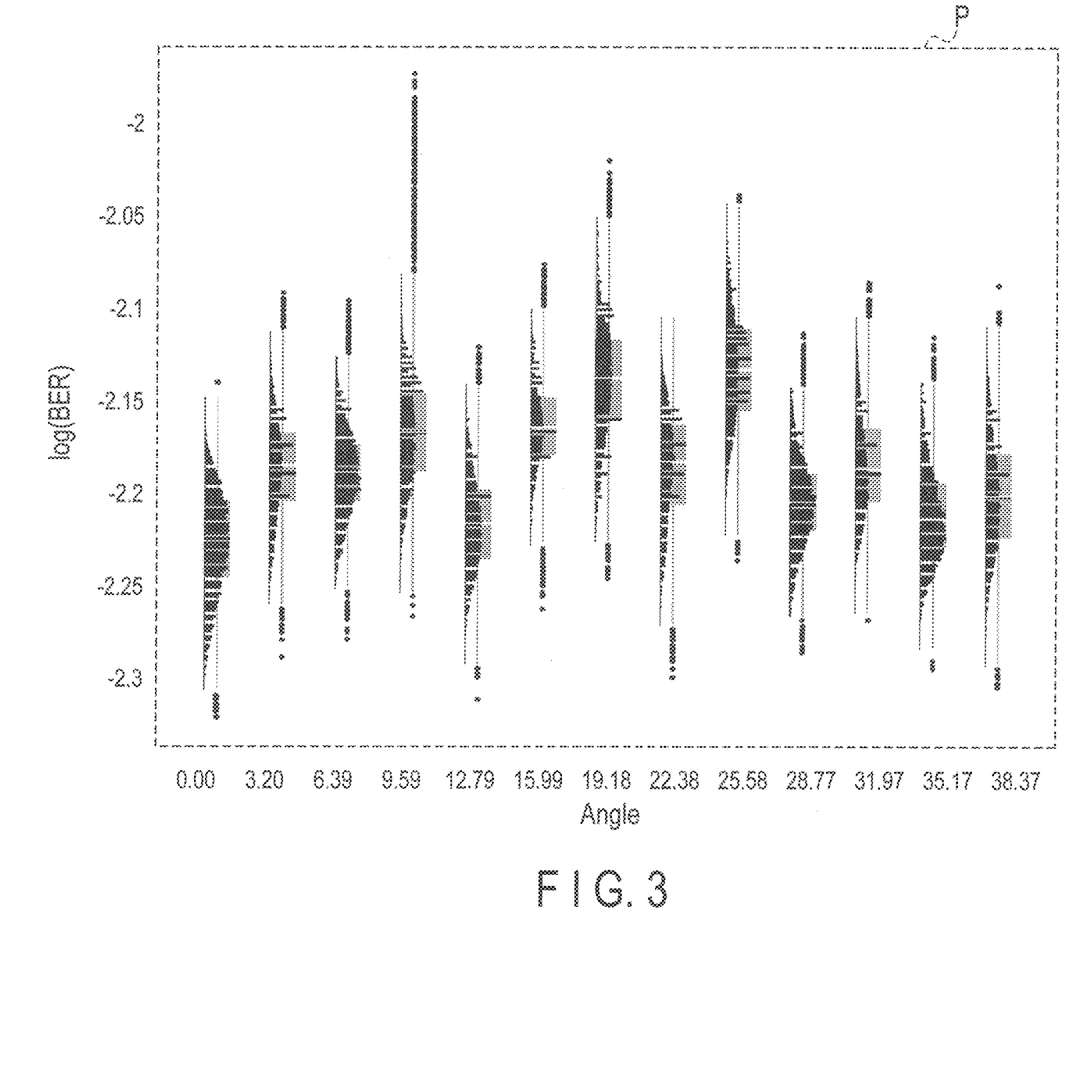
FIG. 3 is an enlarged view of the part P of FIG. 2.

Next, evaluation of the quality of recording of data on the disk will be described. FIG. 2 and FIG. 3 are views for explaining the evaluation of the recording quality of a case where recording of data on the disk is carried out by using a conventional head.

FIG. 2 is a view showing an example of bit error rate (hereinafter referred to as "PPR") distribution of each sector of a case where recording of data is carried out by using a conventional head in the magnetic disk device. It should be noted that the left side shown in FIG. 2 is the BER distribution 10A of the head 10, and right side shown in FIG. 2 is the BER distribution 10B of another head 10. The two BER distributions 10A and 10B are those obtained by using the different heads 10 having the identical configuration. As shown in FIG. 2, both the BER distributions 10A and 10B originate from the different heads and disks, and hence it can be seen that the BER distributions 10A and 103 largely differ from each other in the distribution in each sector. It should be noted that an enlarged view of the part P of FIG. 2 is shown in FIG. 3.

Further, in general, regarding the evaluation of the recording quality in the magnetic disk device, evaluation is carried out in units of one circumference or in units of a hundred and several tens sectors. Accordingly, an average BER in units of ¼ to one circumference is evaluated, and the set value of the recording current is determined according to the evaluation result. However, as shown in FIG. 2, when the variation in the BER is evaluated for each sector, a variation for each of several sectors, low-frequency undulation in which the BER distribution varies throughout one circumference, and the like are observed, and thus complicated features are revealed. Such a variation in the intra-circumference distribution is approximately coincident with, for example, the intra-circumference coercive force distribution of the disk and, one of the factors in causing the variation is a change in the intra-circumference magnetic characteristics occurring in the manufacturing process of the disk. As described above, there is a variation in one circumference, and hence when recording of data is carried out by using a fixed current value in one circumference, data recording is carried out in a specific sector on the basis of unoptimized setting of the recording current.

FIG. 3 is an enlarged view of the part P of FIG. 2. More specifically, FIG. 3 is a view in which the BER distribution measured for each sector is enlarged in the angular direction. In this embodiment, measurement is carried out 500 times for each sector, and hence the results of the measurement of 500 times are shown in the form of distribution. In FIG. 2, the width in the angular direction is shown as the range of the whole sector, and hence the distribution in the lateral direction in FIG. 2 cannot visually be confirmed. Accordingly, in FIG. 2, values deviating from the appropriate BER distribution required of the head in the vertical direction are indicated in an emphasizing manner.

Figure 4:
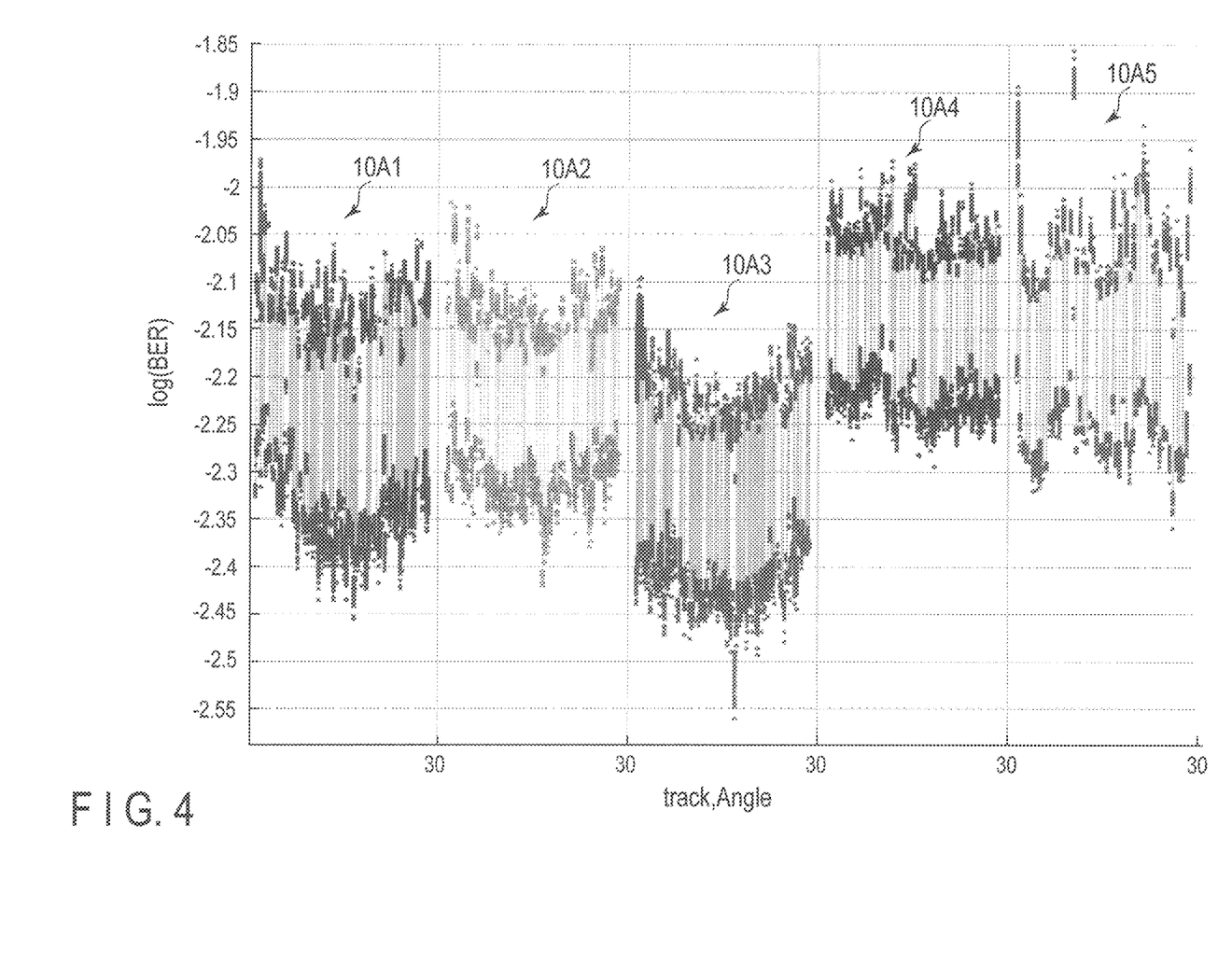
FIG. 4 is a view showing an example of a result of radial-position dependence of the hitherto known BER distribution.

FIG. 4 is a view showing an example of a result of radial-position dependence of the BER distribution. It should be noted that the left side shown in FIG. 4 indicates the BER distribution of radial positions on the outer circumferential side of the disk, and right side shown in FIG. 4 indicates the BIER distribution of radial positions on the inner circumferential side of the disk.

Figure 5:
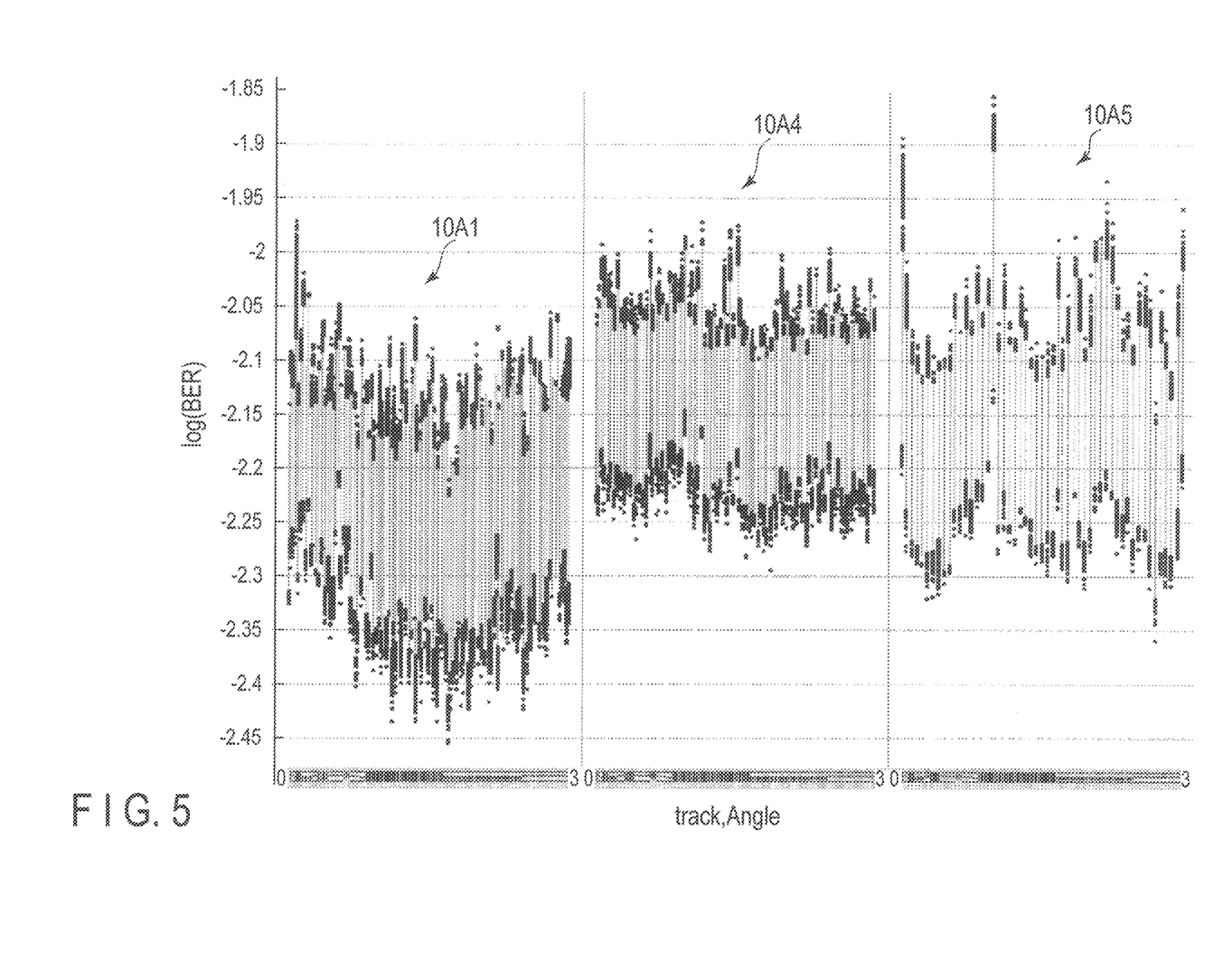
FIG. 5 is a view showing an example of the hitherto known BER distribution at different radial positions of each sector.
Figure 6:
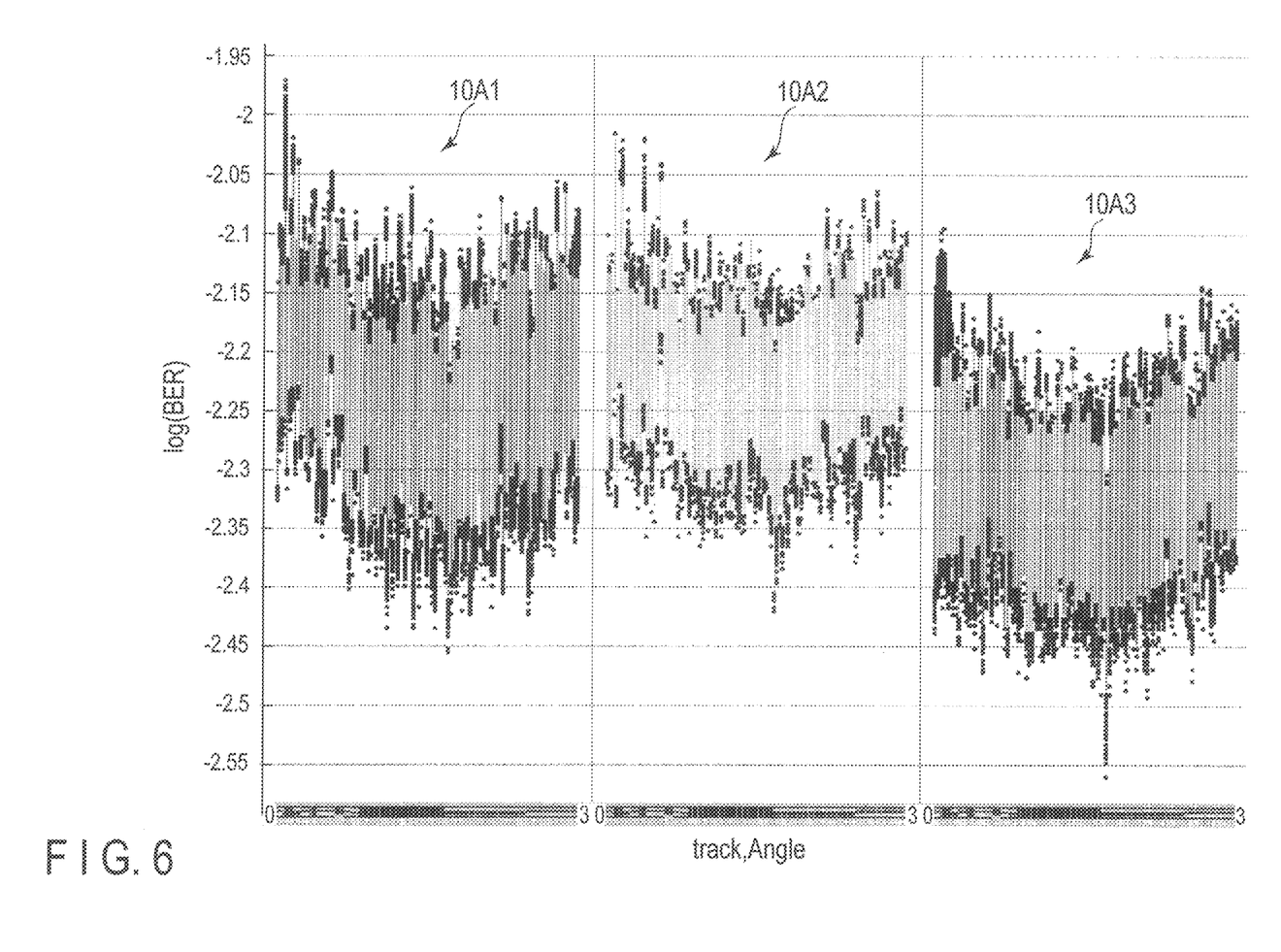
FIG. 6 is a view showing an example of the hitherto known BER distribution in a continuous track on the outer circumferential side of each sector.

In FIG. 4, the BER distributions 10A1 to 10A5 are shown, and the lower number corresponds to the BER distribution of radial positions closer to the outer circumferential side. Further, the BER distributions 10A1, 10A2, and 10A3 are BER distributions of consecutive radial positions on the outer circumferential side, and BER distribution 10A5 is a BER distribution of radial positions on the inner circumferential side. The BER distribution 10A4 indicates a BER distribution of radial positions of the intermediate circumference between the radial positions on the outer circumferential side and radial positions on the inner circumferential side. It should be noted that FIG. 5 is a view showing an example of the BER distribution at different radial positions of each sector and, in FIG. 5, the BER distributions 10A1, 10A4, and 10A5 of FIG. 4 are shown by being enlarged in the lateral direction in FIG. 5, and it is indicated that the BER distributions at radial positions of the outer circumference, intermediate circumference, and inner circumference differ from each other. Further, FIG. 6 is a view showing an example of the BER distribution on a continuous track on the outer circumferential side of each sector and, in FIG. 6, the BER distributions 10A1, 10A2, and 10A3 of FIG. 4 are shown by being enlarged in the lateral direction. It is indicated that the BER distributions 10A1, 10A2, and 10A3 are distributions having approximately similar figures.

It can be visually confirmed mainly from FIG. 4 that (1) variations in the BER of the high-frequency components can be observed in the BER distributions 10A1, 10A2, and 10A3 of radial positions of the outermost circumference, that (2) low-order undulation of the BER extending throughout one circumference exists, that (3) the adjacent tracks (BER distributions 10A1 and 10A2, and BER distribution 10A3) of the outer circumference have BER distributions approximately similar to each other, and that (4) the feature of the BER distribution largely differs between the outer circumference, intermediate circumference, and inner circumference. In view of the items (1) to (4), it can be seen that it becomes possible to realize a magnetic a disk device capable of carrying out data recording higher in the quality than the conventional disk device by carrying out optimization of recording current setting taking the BER distribution of each sector into consideration for each radial position.

In this embodiment, the magnetic disk device 1 realizing high-quality data recording by utilizing a servo pattern to be generally recorded on the magnetic disk and by changing the track recording density of each sector will be described.

Figures 7, 8:
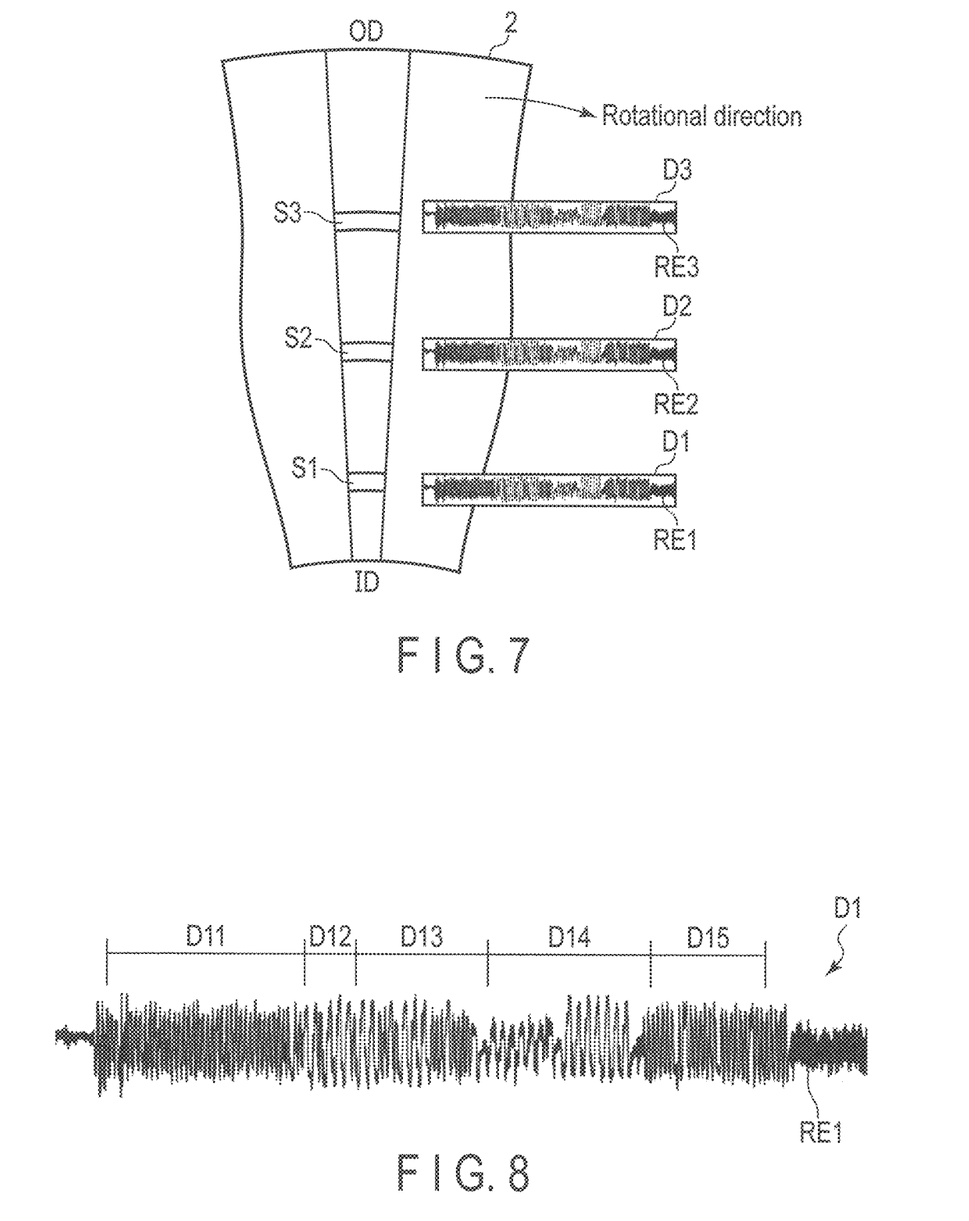
FIG. 7 is a view for explaining a servo pattern according to the first embodiment.
FIG. 8 is a view showing an example of the servo pattern according to the first embodiment.

FIG. 7 is a view for explaining a servo pattern, and FIG. 8 is a view showing an example of the servo pattern. As shown in FIG. 8, in the servo data D1, a plurality of data items D11 to D15 used for positioning of the head, and recording quality determination data RE1 to be described later are included. The servo pattern is written on the disk by means of, for example, a production facility called a servo track writer at the time of manufacture of the magnetic disk device 1.

In FIG. 7, servo patterns D1, D2, and D3 of sectors S1, S2, and S3 provided at three radial positions are shown between the outer circumferential side (OD) of the disk 2 and inner circumferential side (ID) of the disk 2. It should be noted that in FIG. 7, although the servo patterns D1, D2, and D3 of the three sectors S1, S2, and S3 are shown for the sake of convenience of illustration, a servo pattern is recorded on each sector. In the servo patterns D1, D2, and D3, recording quality determination data items RE1, RE2, and RE3 are respectively included. Hereinafter, the servo patterns are collectively called the servo pattern D in some cases, and recording quality determination data items are collectively called the recording quality determination data RE in some cases. The recording quality determination data items RE1 to RE3 are data items used to determine the characteristics (recording quality) of the recording medium of their corresponding sectors. The recording quality determination data RE may be configured, for example, in such a manner as to indicate a data amount corresponding to the recording quality or may be configured in such a manner as to become data indicating "1" when the recording quality drastically exceeds the fixed quality, and become data indicating "0" when the recording quality is on such a level as to normally exceed the fixed quality.

It should be noted that in order to secure the good recording quality, quality better than a certain quality level is secured for each of the sectors S1, S2, and S3. These recording quality determination data items RE1 to RE3 can be obtained in advance when the processing of recording the servo pattern D on the disk 2 is to be carried out by utilizing the BER distribution acquirable from the disk 2 on which a test pattern is recorded and by detecting the recording quality of each sector. Further, it is conceivable that the recording quality determination data items RE1 to RE3 may respectively be included in the servo patterns of the sectors. Thereby, when recording data is to be recorded on the disk 2, it becomes possible for the MPU 14 to detect the recording quality of a sector which is an object of data writing, and set an optimum recording condition.

Figure 9:
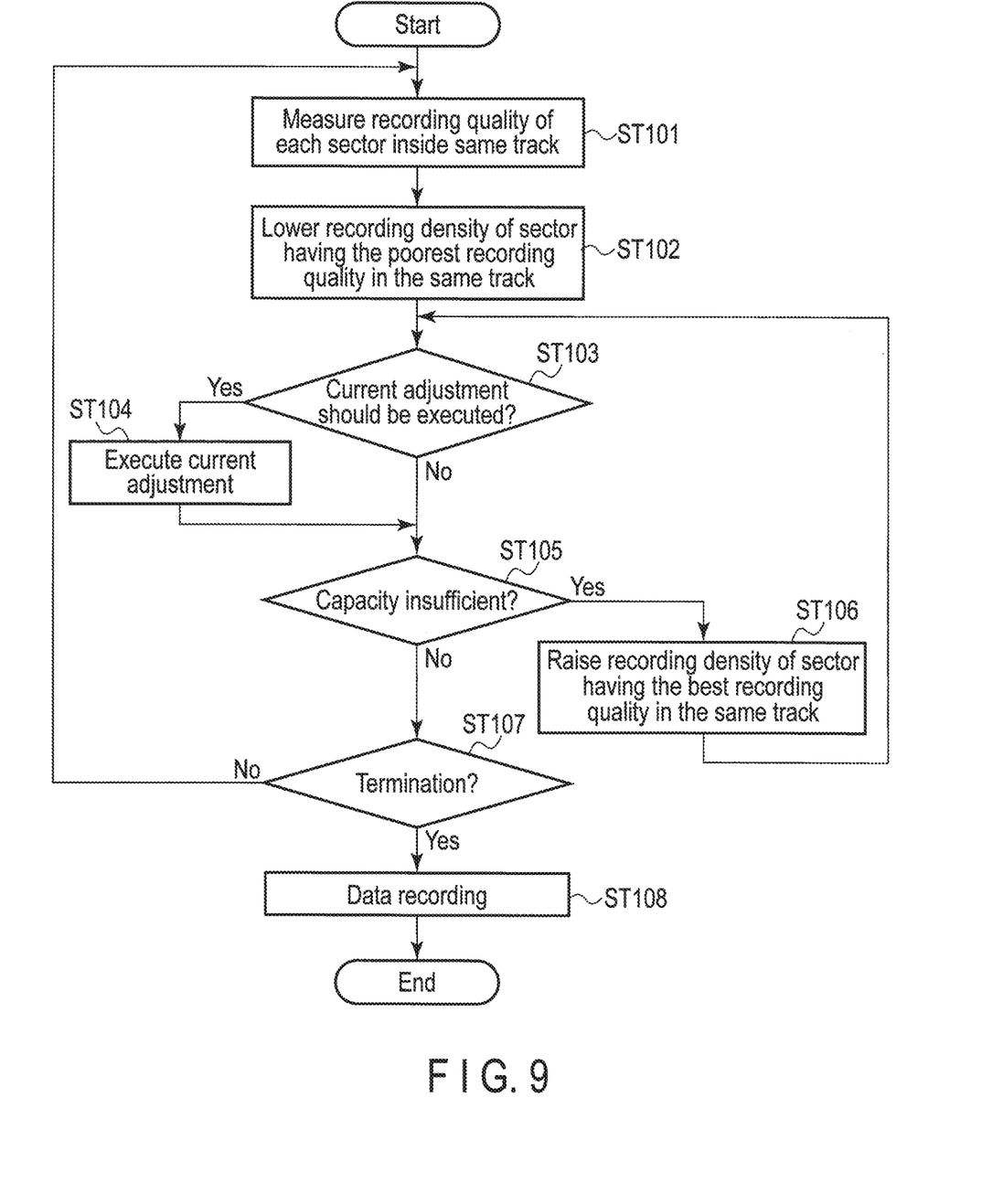
FIG. 9 is a flowchart showing an example of processing of setting a recording condition and carrying out data recording on the disk.

Next, the processing of setting a recording condition on the basis of the servo pattern D, and carrying out recording of data will be described below. FIG. 9 is a flowchart showing an example of processing of setting a recording condition of data and carrying out recording of data on the disk 2 to be executed by the MPU 14.

First, the MPU 14 measures the recording quality of each sector inside the same circumference of the disk 2, i.e., the recording quality of each sector on the same track (ST101). The MPU 14 acquires the recording quality determination data RE of each sector inside the same predetermined track from the servo pattern D. Then, the NPU 14 lowers the track recording density of a sector having the poorest recording quality in the same track (ST102).

Next, the MPU 14 determines whether or not current adjustment should be executed (ST103). Upon determination that the current adjustment should be executed (ST103: YES), the MPU 14 executes the current adjustment (ST104). When the current adjustment has been executed (ST104) or when the current adjustment has not been executed (ST103: NO), the NPU 14 determines whether or not the capacity is insufficient (ST105). This current adjustment is executed by the MPU 14 by, for example, controlling the STO control section 111 and recording coil control section 112. By adjusting the current value to an appropriate current setting value in accordance with the changed track recording density, it is possible to correct the variations in the BER of the low-frequency at the normal recording current, and suppress the high-frequency variations at the current to be supplied to the STO, or alternatively, by adjusting the current value in the manner opposite to the above or by adjusting the current value in a complex manner, it is possible to realize equalization of the variations in the BER. For example, when the track recording density is to be lowered, the MPU 14 can lower the current value. Thereby, it is possible to improve the recording quality of the sector concerned without increasing the recording width. However, when the recording density becomes less, the data recording capacity becomes less correspondingly.

Upon determination that the capacity is insufficient (ST105: YES), the MPU 14 raises the track recording density of a sector having the best recording quality of all the sectors in the same track (ST106). Then, the processing returns to step ST103. Thereby, the determination of aforementioned step ST103 whether or not the current adjustment should be executed is carried out by the MPU 14.

Here, the method of adjusting the track recording density will be described below in detail. As already described above, in this embodiment, when the MPU 14 lowers the track recording density of a sector having the poor BER to thereby equalize the recording quality in the same track, the MPU 14 raises the track recording density of a sector having the good HER in the same track in order to guarantee the recording capacity of the magnetic disk device 1. It should be noted that in this embodiment, although the sector whose track recording density is to be changed is described in connection with the case where it is determined that the track recording density of the sector should be changed on the basis of the recording quality determination data RE included in the servo pattern D, variations in the BER of each sector of the data area may be taken into consideration in addition to the recording quality determination data RE. By lowering the track recording density of the sector having the poorest quality in the same track, it becomes possible to secure the recording quality of the sector concerned. Thereby, a state where the sector whose track recording density has been changed, and sector whose track recording density has not been changed have different block lengths is brought about. Further, the sector whose track recording density has been lowered, and sector whose track recording density has been raised are included in the same track, and hence a state where track recording densities providing two or more extreme values are included in the same track is brought about.

Furthermore, as described above with reference to aforementioned FIG. 4, BER distributions of sectors adjacent to each other tend to be similar to each other. Accordingly, when a recording condition of an arbitrary sector is to be set, the MPG 14 may utilize the recording quality determination data RE of each of the sectors present in front of and behind the arbitrary sector, and on the right and left of the arbitrary sector to thereby set the recording condition of the arbitrary sector concerned. When the track recording density is lowered in this way, if the capacity is insufficient, the recording capacity of the magnetic disk device 1 may be guaranteed by utilizing the recording quality determination data of each of the sectors present in front of and behind the arbitrary sector, and on the right and left of the arbitrary sector, and by increasing the track recording density of the sector having the best quality or by increasing the track recording densities of a plurality of sectors including sectors surrounding the sector having the best quality. In this way too, it is possible to carry out equalization (equalization of variations in the BER) of the recording quality. By carrying out the equalization of the recording quality in the manner described above, it is possible to change the track recording density in such a manner as to eliminate the fluctuation already described previously with reference to FIG. 2 and FIG. 4, i.e., the fluctuation of the low order such as the first or second order, and equalize the variations in the BER. Accordingly, when the equalization of the recording quality is carried out and recording of data is also carried out by the processing of this embodiment, in the BER distribution of the data recorded in the manner described above, the fluctuation is remarkably reduced as compared with the BER distributions 10A and 10B of FIG. 2 and FIG. 4.

On the other hand, when it is determined that the capacity is not insufficient (ST105: NO), the MPU 14 determines whether or not the processing should be terminated (ST107). For example, this determination is carried out on the basis of whether or not all the processing items have been completed with respect to the tracks which are the objects of recording. When it is determined by the MPU 14 that the processing should not be terminated (ST107: NO), the processing returns to step ST101 and, upon determination that the processing should be terminated, the MPU 14 executes recording of data on the basis of the set recording condition (ST108).

According to the magnetic disk device 1 described as above, when data is to be recorded on the disk 2 by means of the head 10, it is possible to set a recording condition for each servo sector of the disk 2 on the basis of the servo pattern D used for positioning of the head 10 on the disk 2, and record data on the disk 2 according to the set recording condition. Accordingly, it is possible for the magnetic disk device 1 to appropriately set the recording condition, and improve the quality of magnetic recording.

Further, part of the servo pattern D is made to include the recording quality determination data RE, whereby it becomes Possible for the magnetic disk device 1 to simultaneously carry out positioning of the head 10 and setting of the recording condition.

It should be noted that in this embodiment, the recording quality determination data RE is included in the servo pattern D, and hence about 0.5% of the surface recording density of the disk 2 is lost. However, it is possible to record data under the recording condition suited to the characteristics of each sector, whereby a gain of 1% or more in the surface recording density can be expected. Accordingly, the surface recording density is improved as a whole.

Figure 10:
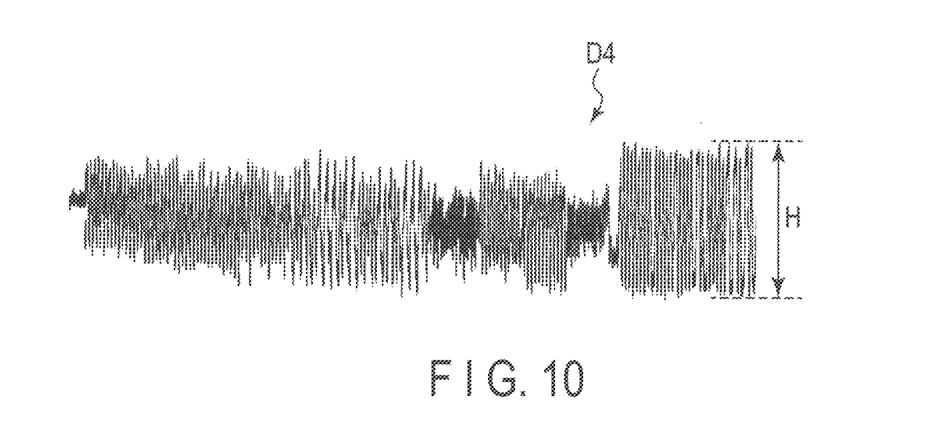
FIG. 10 is a view showing another example of the servo pattern according to the first embodiment.

Further, in the above embodiment, although the configuration in which the recording quality determination data RE is included in the servo pattern D has been described, the method of setting the recording condition by using the servo pattern is not limited to the above. For example, the magnitude of the amplitude H of data included in the hitherto known servo pattern may be utilized. FIG. 10 is a view showing another example of the servo pattern. As shown in FIG. 10, it is conceivable that the amplitude H of the data part at the tail end of the data included in the servo pattern D4 is utilized to carry out determination in such a manner that, for example, when the amplitude H is greater than a predetermined width, it is indicated that the recording quality of the sector concerned drastically exceeds the fixed quality and, when the amplitude H is less than or equal to the predetermined width, it is indicated that the recording quality thereof is on such a level as to normally exceed the fixed quality. Such a configuration described above also makes it possible to obtain the same effect as the embodiment described above. Further, it is not necessary to add the recording quality determination data RE to the servo pattern D4, and hence it is possible to prevent a loss in the surface recording density of the disk 2 from occurring.

Another Embodiment

Figure 11:
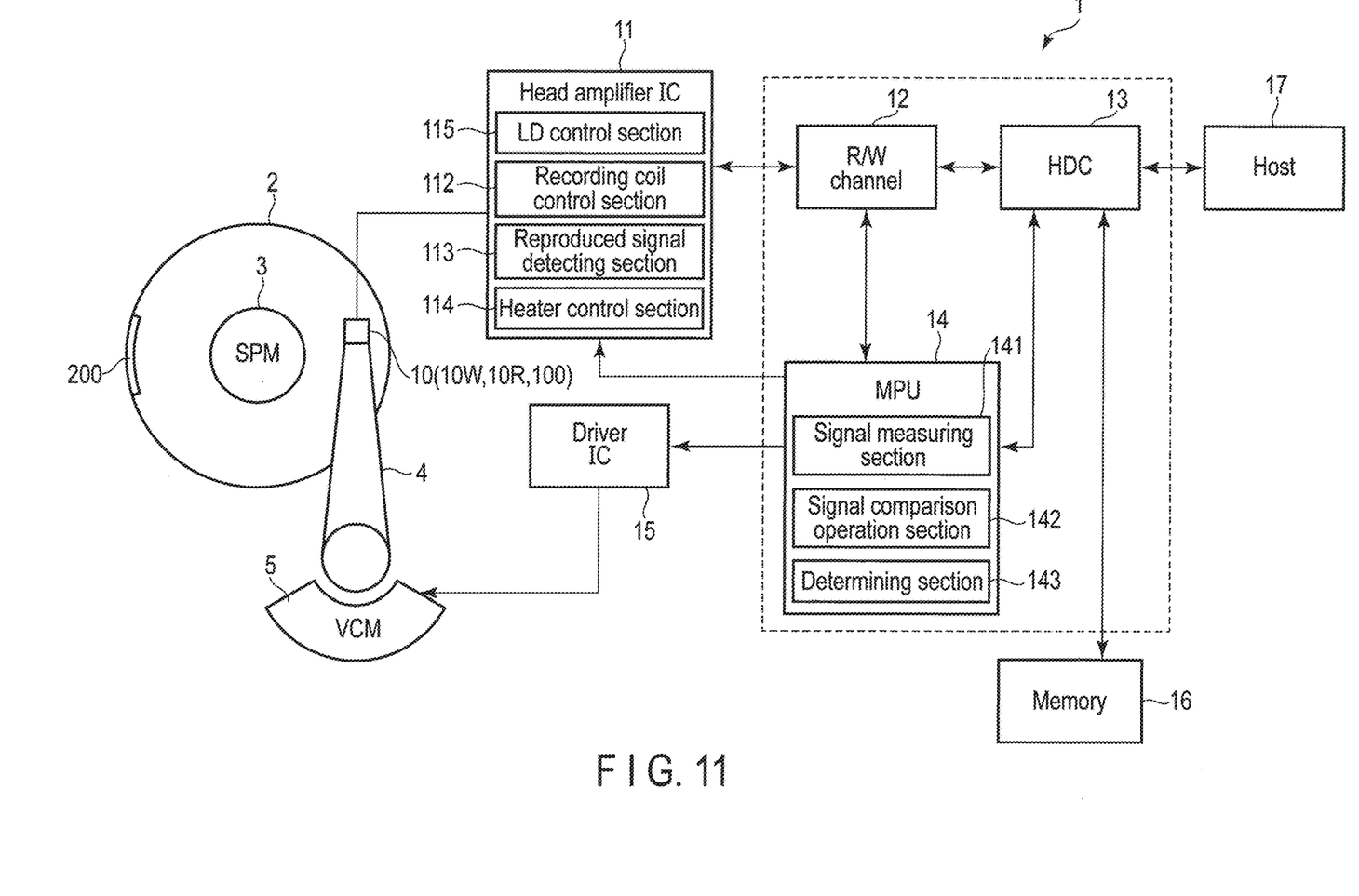
FIG. 11 is a view showing an example of the configuration of a magnetic disk device according to another embodiment.

In the above embodiment, although the magnetic disk device 1 in which the STO control section (high-frequency assist) 111 is used when recording of data is to be carried out has been described, the magnetic disk device to which the present invention can be applied is not limited to the magnetic disk device using the high-frequency assist. For example, a magnetic disk device using the thermal assist may also be employed. FIG. 11 shows an example of the schematic configuration of a magnetic disk device 1 in which the thermal assist is used when recording of data is to be carried out. As shown in FIG. 11, in the magnetic disk device 1, a laser diode (LD) control section 115 (thermal assist control section) is provided in place of the STD control section (see FIG. 1) 111. Furthermore, it is possible to apply the present invention to also a magnetic disk device in which the assist based on the high frequency or heat is not used when recording of data is carried out.

Further, in the above embodiment, although the description has been given of the case where no restrictions are put on the percentage by which the track recording density is changed when the track recording density is to be changed, restrictions may be put on the percentage. For example, it is conceivable that the processing of changing the tack recording density may be executed in such a manner that a difference between the percentages by which the track recording densities of sectors adjacent to each other are changed is limited to a fixed percentage or less, e.g., 10% or less. By virtue of such a configuration, it is possible to avoid a situation in which the track recording densities of adjacent sectors largely differ from each other, and hence it becomes possible to smoothly carry out data recording processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a magnetic head;
a magnetic disk on which a servo pattern used to position the magnetic head when data is to be recorded by means of the magnetic head is recorded; and
a control section configured to set a recording condition for each servo sector of the magnetic disk on the basis of the servo pattern, and carry out recording of data on the magnetic disk according to the set recording condition,
wherein the recording condition is a condition that the track recording density of the magnetic head be changed according to a low-order fluctuation for each servo sector.

2. The magnetic disk device of claim 1, wherein
the servo pattern includes recording quality data indicating the recording quality of each servo sector, and
the control section changes the recording condition on the basis of the recording quality data and changes the track recording density according to the low-order fluctuation.

3. The magnetic disk device of claim 1, wherein
the servo sector is a sector provided for each predetermined area in the track direction, and
the track recording density changes in units of sectors.

4. The magnetic disk device of claim 1, wherein
the control section changes the track recording densities of sectors adjacent to each other in the tack direction in such a manner that a difference between changes in the track recording densities of the sectors is less than or equal to a predetermined percentage.

5. The magnetic disk device of claim 1, wherein
the control section determines the track recording density of an arbitrary sector on the basis of the track recording density of a sector adjacent to the arbitrary sector.

6. The magnetic disk device of claim 1, further comprising an assist control section configured to assist the magnetic head in recording of data, wherein
when recording the data on the magnetic disk, the control section controls the magnitude of the assist of the assist control section according to the recording condition.

* * * * *